US006486901B1

(12) United States Patent
DeBoer et al.

(10) Patent No.: US 6,486,901 B1
(45) Date of Patent: Nov. 26, 2002

(54) MICROFLUIDIC PRINTING WITH GEL-FORMING INKS

(75) Inventors: Charles D. DeBoer, Palmyra; Werner Fassler; Xin Wen, both of Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 602 days.

(21) Appl. No.: 08/919,559

(22) Filed: Aug. 29, 1997

(51) Int. Cl.[7] ............................ B41J 2/21; G01D 15/16
(52) U.S. Cl. ....................................... 346/140.1; 347/43
(58) Field of Search ....................... 346/140.1; 347/105, 347/93, 95, 96, 100

(56) References Cited

U.S. PATENT DOCUMENTS 5,585,069 A 12/1996 Zanzucchi et al. ....... 106/31.43
5,593,838 A 1/1997 Zanzucchi et al. .......... 137/597
5,603,351 A 2/1997 Cherukuri et al. ............. 435/6
5,611,847 A 3/1997 Guistina et al. ............ 422/100

OTHER PUBLICATIONS

Dasgupta et al., see "Electroosmosis: A Reliable Fluid Propulsion System for Flow Injection Analyses", Anal. Chem. 66, pp. 1792–1798 (1994).

Neblette's Eighth edition of "Imaging Processes and Materials", Edited by John Sturge, Vivian Walworth and Allan Shepp, published in 1989 by Van Nostrand Reinhold of New York, pp. 197 and 220.

*Primary Examiner*—Lamson Nguyen
(74) *Attorney, Agent, or Firm*—Raymond L. Owens

(57) ABSTRACT

A method for microfluidic printing comprising pumping and mixing colored inks which comprise a mixture of colorants, fluids, and gel-forming or gel-initiating ingredients to form ink pixels and to transfer such ink pixels to a receiver transferring position; and transferring the ink pixels to a reflective receiver which contains gel-forming or gel-initiating ingredients so that the ingredients in the transferred ink pixels and in the receiver react to form a gel and the viscosity of the transferred ink rapidly increases to limit the flow of ink pixels whereby such ink pixels are fixed to the receiver and overprinting of colors is minimized.

6 Claims, 2 Drawing Sheets

MICROFLUIDIC PRINTING WITH GEL-FORMING INKS

CROSS REFERENCE TO RELATED APPLICATIONS

Reference is made to commonly assigned U.S. patent application Ser. No. 08/868,426, filed Jun. 3, 1997 entitled "Continuous Tone Microfluidic Printing"; U.S. patent application Ser. No. 08/868,104, filed Jun. 3, 1997 entitled "Image Producing Apparatus for Microfluidic Printing"; U.S. patent application Ser. No. 08/868,416, filed Jun. 3, 1997 entitled "Microfluidic Printing on Receiver"; U.S. patent application Ser. No. 08/868,102, filed Jun. 3, 1997 entitled "Microfluidic Printing With Ink Volume Control"; and U.S. patent application Ser. No. 08/868,477, filed Jun. 3, 1997 entitled "Microfluidic Printing With Ink Flow Regulation" to Wen, Fassler, and DeBoer; and U.S. patent application Ser. No. 08/920,530, filed concurrently herewith entitled "Microfluidic Printing Using Hot Melt Ink" to Wen, Fassler, and DeBoer, all assigned to the assignee of the present invention. The disclosure of these related applications is incorporated herein by reference.

FIELD OF THE INVENTION

The present invention relates to printing high quality continuous tone images by microfluidic pumping of colored inks onto receivers.

BACKGROUND OF THE INVENTION

Microfluidic pumping and dispensing of liquid chemical reagents is the subject of three U.S. Pat. Nos. 5,585,069, 5,593,838, and 5,603,351, all assigned to the David Sarnoff Research Center, Inc. The system uses an array of micron sized reservoirs, with connecting microchannels and reaction cells etched into a substrate. Electrokinetic pumps comprising electrically activated electrodes within the capillary microchannels provide the propulsive forces to move the liquid reagents within the system. The electrokinetic pump, which is also known as an electroosmotic pump, has been disclosed by Dasgupta et al., see "Electroosmosis: A Reliable Fluid Propulsion System for Flow Injection Analyses", Anal. Chem. 66, pp 1792–1798 (1994). The chemical reagent solutions are pumped from a reservoir, mixed in controlled amounts, and them pumped into a bottom array of reaction cells. The array may be decoupled from the assembly and removed for incubation or analysis. When used as a printing device, the chemical reagent solutions are replaced by dispersions of cyan, magenta, and yellow pigment, and the array of reaction cells may be considered a viewable display of picture elements, or pixels, comprising mixtures of pigments having the hue of the pixel in the original scene. When contacted with paper, the capillary force of the paper fibers pulls the dye from the cells and holds it in the paper, thus producing a paper print, or reproduction, of the original scene. One problem with this kind of printer is the tendency of the ink to dry out and plug the small openings which deliver the ink to the paper. Another problem is that of controlling the density of the print. The force of capillary attraction can pull more ink than is needed from the printing apparatus, leading to excessive density in the print, as well as color bleeding and incorrect colors.

It would be desirable to have a compact, low powered printer which uses an ink that is highly effective in microfluidic printing and overcomes the above problems.

SUMMARY OF THE INVENTION

An object of this invention is to provide an rapid way to print a high quality continuous tone image.

It is another object of this invention is to provide improved ink which can be used in microfluidic printing and which does not dry out and plug in the printer and is highly effective for being fixed to a receiver.

These objects are achieved by a method for microfluidic printing comprising:

a) pumping and mixing colored inks which comprise a mixture of colorants, fluids, and gel-forming or gel-initiating ingredients to form ink pixels and to transfer such ink pixels to a receiver transferring position; and b) transferring the ink pixels to a reflective receiver which contains gel-forming or gel-initiating ingredients so that the ingredients in the transferred ink pixels and in the receiver react to form a gel and the viscosity of the transferred ink rapidly increases to limit the flow of ink pixels whereby such ink pixels are fixed to the receiver and overprinting of colors is minimized.

ADVANTAGES

The present invention provides high quality microfluidic prints by using an ink which does not clog or plug through the effective use of gel-forming ingredients and gel-initiating ingredients and permits the ink pixels to be readily fixed to a receiver. As the ink pixels are transferred, the viscosity of the ink rapidly increases, limiting ink flow and preventing color bleeding. The increasing viscosity prevents the printing of overly dense colored pixels. The prevention of overly dense colored pixels provides for improved image quality. The use of inks in accordance with the present invention does not effect the power requirements of the printer and permits fast printing since all the pixels are printed simultaneously.

Another feature of the invention is that the printer may be operated under a wide variety of conditions and temperatures without color bleeding and excess print density.

DETAILED DESCRIPTION OF THE INVENTION

The present invention is described in relation to a microfluidic printing apparatus which can print computer generated images, graphic images, line art, text images and the like, as well as continuous tone images.

Figure 1:
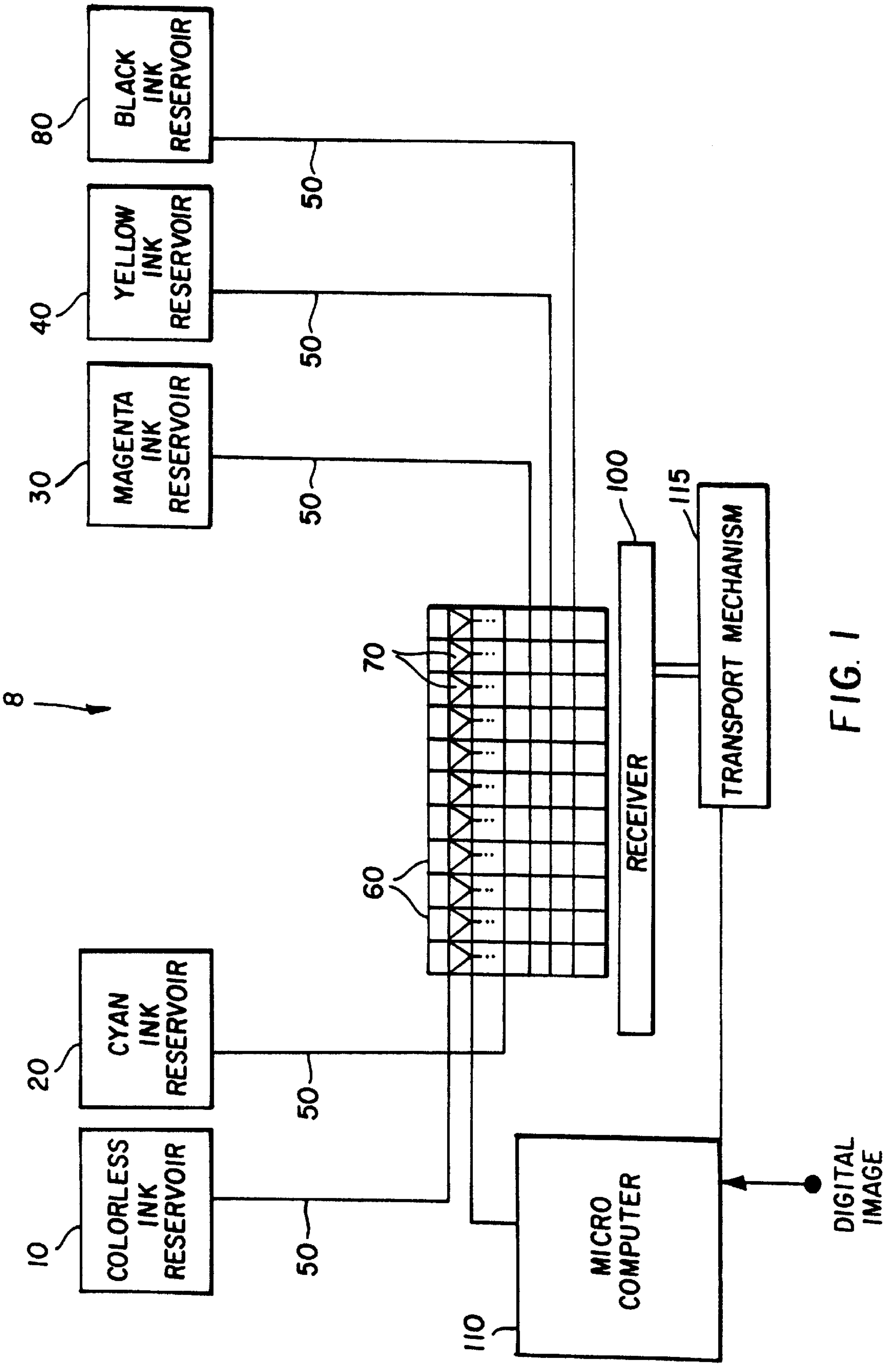
FIG. 1 is a partial schematic view showing an apparatus for pumping, mixing and printing pixels of ink onto a reflective receiver.
Figure 2:
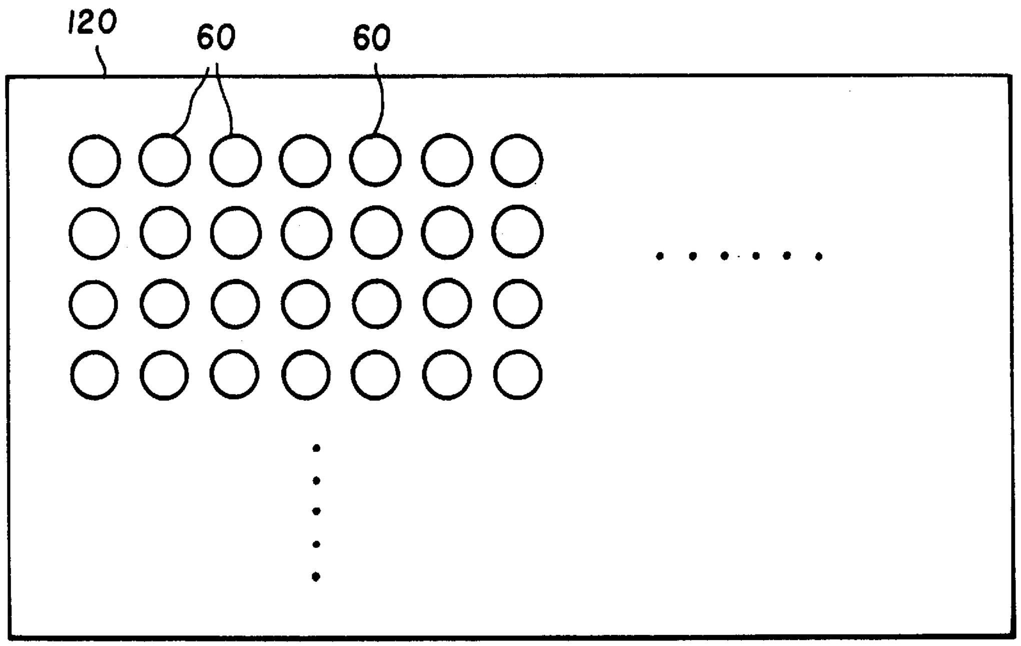
FIG. 2 is a top view of the pattern of the color pixels described in the present invention.

Referring to FIG. 1, a schematic diagram is shown of the method of printing. Reservoirs are shown for colorless ink 10, cyan ink 20, magenta ink 30, and yellow ink 40. There may be included an optional reservoir 80 for black ink. Microchannel capillaries 50 are shown to conduct the ink from the reservoir to the ink pixel mixing chambers 60. The amount of each color ink is controlled by electrokinetic valves 70, which are only shown for the colorless ink channel. Similar valves are used for the other color channels, but these are omitted from the figure for clarity. Finally, a reflective receiver 100 is shown to accept the ink and thereby produce the print. FIG. 2 depicts a top view of the arrangement of mixing chambers 60 shown in FIG. 1. Each ink mixing chamber 60 is capable of producing a mixture of ink having any color saturation, hue and lightness within the color gamut provided by the set of inks used in the apparatus. This results in a continuous tone photographic quality image on the reflective receiver 100.

The inks used in this invention can be dispersions of colorants in common solvents. Examples of such inks may be found is U.S. Pat. No. 5,611,847 by Gustina, Santilli, and Bugner. Inks may also be found in the following commonly assigned U.S. patent application Ser. Nos. 08/699,955 filed Aug. 20, 1996, entitled "Cyan and Magenta Pigment Set"; 08/699,962 filed Aug. 20, 1996, entitled "Magenta Ink Jet Pigment Set"; and 08/699,963 filed Aug. 20, 1996, entitled "Cyan Ink Jet Pigment Set" by McInerney, Oldfield, Bugner, Bermel and Santilli; and in U.S. patent application Ser. No. 08/790,131 filed Jan. 29, 1997, entitled "Heat Transferring Ink Jet Ink Images" by Bishop, Simons and Brick; and in U.S. patent application Ser. No. 08/764,379 filed Dec. 13, 1996, entitled "Pigmented Ink Jet Inks Containing Phosphated Ester Derivatives" by Martin. In a preferred embodiment of the invention the solvent is water combined with water miscible high molecular weight organic compounds such as propylene glycol. The glycol serves both to retard evaporation of the ink both by slow evaporation rate by virtue of high molecular weight and also as a humectant that absorbs water from the air. Exemplary dyes such as those shown in Neblette's Eighth edition of "Imaging Processes and Materials", Edited by John Sturge, Vivian Walworth and Allan Shepp, published in 1989 by Van Nostrand Reinhold of New York, pages 197 and 220, may be dissolved in the water glycol mixture to produce the inks. Such dissolved dye inks are also preferred embodiments of the invention. The colorless ink of this invention is the solvent for the colored inks in the most preferred embodiment of the invention.

The gel forming ingredients in the inks include agar, algin, carrageenan, fucoidan, laminaran, gum arabic, corn hull gum, gum ghatti, guar gum, karaya gum, locust bean gum, pectin, dextrans, starches, carboxymethylcellulose and polyvinyl alcohol. Many of these materials are commonly employed as commercial food thickeners.

The gel initiating ingredients in the receiver of this invention include sodium borate, mineral acids such as hydrochloric and sulfuric acids, organic acids such as acetic and propionic acids, and protonated tertiary amines such as trimethyl ammonium hydrochloride.

The microchannel capillaries, ink pixel mixing chambers and electrokinetic pumps are all fully described in the Sarnoff patents listed above.

The reflective receiver 100 can be common paper having sufficient fibers to provide a capillary force to draw the ink from the mixing chambers into the paper. Synthetic papers may also be used. The gel initiating ingredient of the receiver can be coated by typical coating methods such as extrusion hopper coating or may be printed onto the receiver by, for example, a gravure process.

The typical printing operation in the present invention involves the following steps. First the printer receives a digital image file includes electronic signals in which the color code values are characterized by bit depths of an essentially continuous tone image, for example, 8 bits per color per pixel. Based on the color code values at each pixel, which define the lightness, hue and color saturation at the pixel, the electrokinetic pumps at the corresponding pixel pump the designated cyan, magenta, yellow and clear ink in an amount corresponding to the code value from the ink reservoirs 20, 30, 40 and 80, into the pixel mixing chambers 60. The chambers provide an ink transfer position where colored ink pixels can be transferred to a receiver by capillary action. The mixture of inks, which has the same hue, lightness and color saturation as the corresponding pixel of the original image being printed, is held in the mixing chamber by the surface tension of the ink. The reflective receiver 100 is subsequently placed in contact with the ink meniscus of the ink mixing chamber 60 within the printer front plate 120. The mixture of inks contained in the mixing chamber 60 is then drawn into the reflective receiver by the capillary force of the paper fibers, until the gel forming reaction occurs. At that time the viscosity of the ink increases rapidly, and the flow of the ink is limited. In this way, not only are pixels fixed to the receiver, but both the bleeding of the colors and printing of overly dense colored pixels are minimized. Thus, an improved image is provided.

Ink from the black ink reservoir 80 may be included in the colored in mixtures to improve the density of dark areas of the print, or may be used alone to print text, or line art, if such is included in the image being printed.

Figure 3:
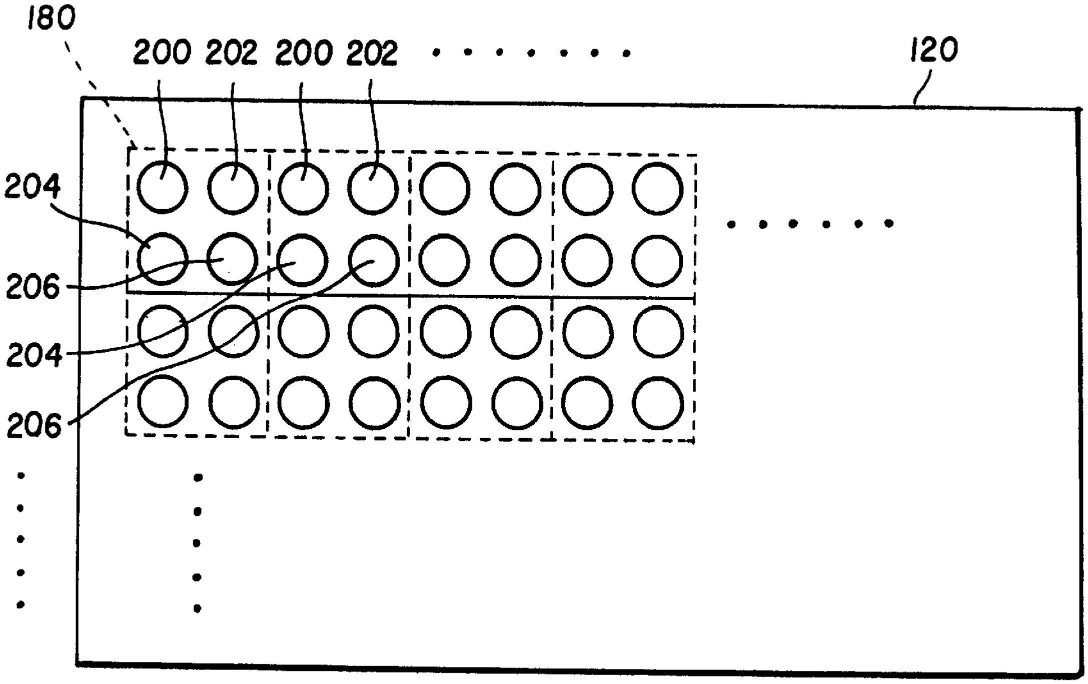
FIG. 3 is a top view of an alternate pattern of the color pixels described in the present invention.

In an alternate scheme for printing with this invention, shown in FIG. 3, the ink mixing chambers are divided into four groups: cyan ink mixing chamber 200, magenta ink mixing chamber 202, yellow ink mixing chamber 204, and black ink mixing chamber 206. Each chamber is connected only to the respective ink color reservoir and to the colorless ink reservoir 10. For example, the cyan ink mixing chamber 200 is connected to the cyan ink reservoir and the colorless ink reservoir so that cyan inks can be mixed to any desired lightness. When the inks are transferred to the reflective receiver 100 the size of the printed pixels will be small enough that the human eye will integrate the color and the appearance of the image will be that of a continuous tone photographic quality image. It will be understood to those skilled in the art that the gel-initiating ingredients can either be provided in the ink or in the receiver. In such a case, the gel-forming ingredients will be provided in the ink or in the receiver so that, after ink transfer, they gel and stop the flow of ink to the receiver to minimize overprinting of colors on the receiver.

The invention has been described in detail with particular reference to certain preferred embodiments thereof, but it will be understood that variations and modifications can be effected within the spirit and scope of the invention.

Parts List

10 colorless ink reservoir
20 cyan ink reservoir
30 magenta ink reservoir
40 yellow ink reservoir
50 microchannel capillaries
60 ink pixel mixing chambers
70 electrokinetic pumps
80 black ink reservoir
100 reflective receiver
120 printer front plate
180 full color pixel
200 cyan ink mixing chamber
202 magenta ink mixing chamber
204 yellow ink mixing chamber
206 black ink mixing chamber

We claim:

1. A method for microfluidic printing comprising:

a) pumping and mixing colored inks which comprise a mixture of colorants, fluids, and gel-forming ingredients to form ink pixels and to transfer such ink pixels to a receiver transferring position; and b) transferring the ink pixels to a reflective receiver which contains gel-initiating ingredients so that the ingredients in the transferred ink pixels and in the receiver react to form a gel and the viscosity of the transferred ink rapidly increases to limit the flow of ink pixels whereby such ink pixels are fixed to the receiver and overprinting of colors is minimized.

2. The method of claim 1 wherein the gel forming ingredients are selected from the group consisting of agar, algin, carrageenan, fucoidan, laminaran, gum arabic, corn hull gum, gum ghatti, guar gum, karaya gum, locust bean gum, pectin, dextrans, starches, carboxymethylcellulose and polyvinyl alcohol.

3. The method of claim 2 wherein the gel-initiating ingredients are selected from the group consisting of sodium borate, mineral acids such as hydrochloric and sulfuric acids, organic acids such as acetic and propionic acids, and protonated tertiary amines such as trimethyl ammonium hydrochloride.

4. The method of claim 3 wherein the ink is a dispersion of a colorant in a solvent.

5. The method of claim 3 wherein the ink is a dye dissolved in a solvent.

6. A method for microfluidic printing comprising:

a) pumping and mixing colored inks which comprise a mixture of colorants, fluids, and gel-initiating ingredients to form ink pixels and to transfer such ink pixels to a receiver transferring position; and b) transferring the ink pixels to a reflective receiver which contains gel-forming ingredients so that the ingredients in the transferred ink pixels and in the receiver react to form a gel and the viscosity of the transferred ink rapidly increases to limit the flow of ink pixels whereby such ink pixels are fixed to the receiver and bleeding of colors is minimized.

* * * * *